May 15, 1951     C. C. WARFIELD     2,552,699
EMERGENCY KEY HOLDER FOR AUTOMOBILES
Filed Nov. 5, 1949
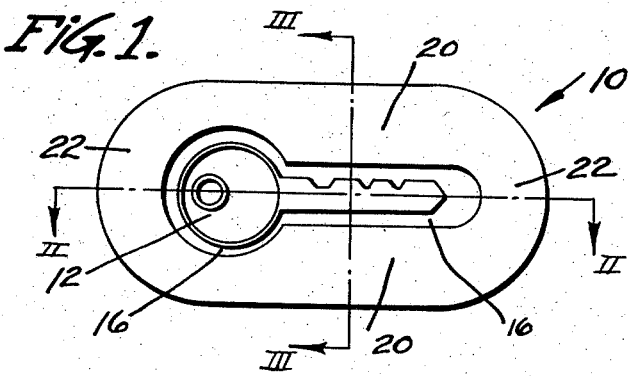
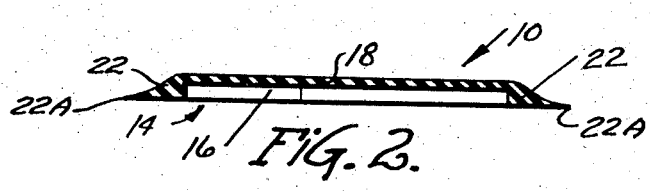
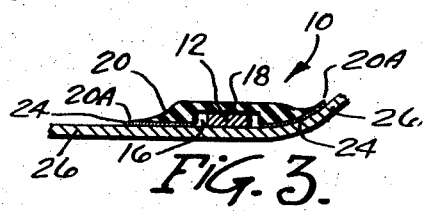
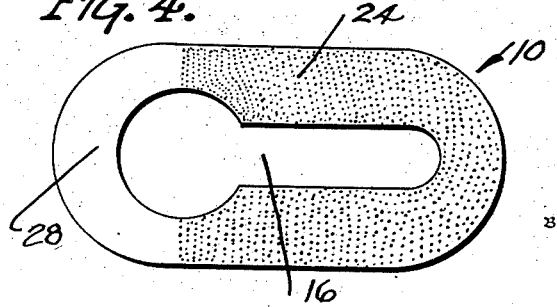
Inventor
CHARLES C. WARFIELD
By Weatherford and Weatherford
Attorneys Patented May 15, 1951

2,552,699

UNITED STATES PATENT OFFICE 2,552,699

EMERGENCY KEY HOLDER FOR AUTOMOBILES

Charles C. Warfield, Lexa, Ark.

Application November 5, 1949, Serial No. 125,717

2 Claims. (Cl. 150—40)

This invention relates to a holder for a key, particularly for an automobile key, for emergency use, which holder is adapted to be adhesively secured to some selected hidden part of an automobile and there retain a key, or keys, and which holder depends upon concealment from unauthorized persons rather than upon difficulty of removal and access to the key.

In the course of operation of an automobile the ignition and door key, now usually the same key, is sometimes either left in the ignition or is lost and under such conditions it is desirable to have an additional key through which access to the car may be had, but rarely if ever is such key available.

It has heretofore been proposed to provide a prominently displayed housing which holds an additional key or keys and is locked by a permutation lock, the combination of which often has been forgotten by the owner, or by a key, which like the other keys has been lost, but which presents little difficulty or delay to a thief who is not averse to smashing it.

The objects of the present invention are:

To provide housing means which being hidden offers no suggestion to a would be thief of its existence and even if such existence is suspected, or even known, requires a search which takes more time for its discovery than is usually available to him;

To provide housing means which lends itself to ready adhesive attachment to a convenient surface;

To provide a thin inconspicious key holder;

To provide a key holder having broad, flat surfaces adaptable for adhesive securing to a supporting surface; and To provide a holder having thin, flexible edge portions adapted for conformation and adhesive securing to a supporting surface.

The means by which the foregoing and other objects of this invention are accomplished and the manner of their accomplishment will readily be understood from the following specification upon reference to the accompanying drawings, in which:

Fig. 1 is a plan view of the under side of the holder with key in place.

Fig. 2 is a longitudinal sectional elevation of the holder taken as on the line II—II of Fig. 1.

Fig. 3 is a transverse view on the line III—III of Fig. 1, showing the holder attached to a partially curved surface; and Fig. 4 is an additional view similar to Fig. 1, showing adhesive on a major portion only of the holder.

Referring now to the drawings in which the parts are indicated by numerals, the holder is a thin, flexible plate 10 preferably of vulcanized rubber of greater length and width than a key 12 which is to be housed therein. The plate is cut out from its under side 14, to form a flat chamber or pocket 16, of key shape, having a depth of about half plate thickness, with an unbroken cover portion 18 and chamber surrounding side and end edge portions 20 and 22.

The upper surfaces of the edge portions 20 and 22 are preferably thinned outward from the cover portion, to knife like edges having increased flexibility and thereby made more readily conformable to curved or irregular surfaces.

The holder is completed into a housing by coating the undersurface 14 of the edge portions 20 and 22 with a thin layer 24 of adhesive cement, such as the rubber cements available in the open market, which adhesive is supplied to the purchasers of the holder, the cement being applied to the holder and with the key nested therein, the holder being firmly pressed against the selected portion 26 of the automobile and thereby attached thereto.

If desired, as shown in Fig. 4, a major portion of the holder may be coated with the adhesive 24 leaving preferably an end sector 28 of the holder uncoated, and so treated may be attached to the automobile. The key may be in the holder pocket 16 when such attachment is made, or may later be placed therein by deflecting the unattached sector of the holder outward and may be subsequently removed by similar deflection, and after use be replaced for a later emergency.

In use the holder with key therein is attached to some selected hidden portion of the automobile, as the inner side of a hub cap, under side of a fender, or inner side of the car frame, which portion though hidden is accessible and cannot be rendered inaccessible by locking the car. Subsequently, should necessity arise, the holder is removed or the unattached end portion is deflected and the key removed for use.

Obviously a key so hidden might be found by an unauthorized person, but there being no visible indication that a key is so hidden and there being so much available space that must be searched there is little chance of such discovery.

I claim:

1. Means for hiding for emergency use, an automobile key, said means including a thin sheet like strip of material of the nature of resilient vulcanized rubber, of substantially greater length and breadth, and thicker than said key, chambered intermediate its length and breadth inward from one surface to a depth less than its thickness to form a key receiving pocket having surrounding edge portions of substantial width, and said surface of said edge portions being coated with adhesive, and with said key in said pocket, being adhesively attached to an accessible concealed surface of said automobile.

2. Means for hiding for emergency use, an automobile key, said means including a thin sheet like strip of material of the nature of resilient vulcanized rubber, of substantially greater length and breadth, and thicker than said key, chambered intermediate its length and breadth inward from one surface to a depth less than its thickness to form a key receiving pocket having surrounding edge portions of substantial width, the other edges of said edge portions opposite to said surface being thinned to a feather edge, and said surface of said edge portions being coated with adhesive, and with said key in said pocket ahdesively attached to an accessible concealed surface of said automobile.

CHARLES C. WARFIELD.

REFERENCES CITED

The following references are of record in the file of this patent:

UNITED STATES PATENTS

| Number | Name | Date |
|---|---|---|
| 464,728 | Evans | Dec. 8, 1891 |
| 500,800 | Coulter | July 4, 1893 |
| 1,206,256 | Roy | Nov. 28, 1916 |
| 2,119,068 | Baughman et al. | May 31, 1938 |
| 2,119,773 | Buckner | June 7, 1938 |